US010125480B2

(12) United States Patent
Breton

(10) Patent No.: US 10,125,480 B2
(45) Date of Patent: Nov. 13, 2018

(54) SYSTEM AND METHOD FOR FLUSHING A DRAIN TRAP

(71) Applicant: Ken Breton, Sterling Heights, MI (US)

(72) Inventor: Ken Breton, Sterling Heights, MI (US)

( * ) Notice: Subject to any disclaimer, the term of this patent is extended or adjusted under 35 U.S.C. 154(b) by 64 days.

(21) Appl. No.: 15/347,737

(22) Filed: Nov. 9, 2016

(65) Prior Publication Data

US 2018/0127963 A1    May 10, 2018

(51) Int. Cl.
| E03C 1/304 | (2006.01) |
| E03C 1/122 | (2006.01) |
| G05D 7/06 | (2006.01) |
| E03C 1/284 | (2006.01) |
| E03F 9/00 | (2006.01) |
| E03F 5/14 | (2006.01) |
| B08B 9/02 | (2006.01) |

(52) U.S. Cl.
CPC ............ *E03C 1/304* (2013.01); *E03C 1/1222* (2013.01); *E03C 1/284* (2013.01); *G05D 7/0635* (2013.01); *B08B 9/02* (2013.01); *E03F 5/14* (2013.01); *E03F 9/00* (2013.01); *E03F 9/002* (2013.01); *E03F 9/005* (2013.01); *E03F 9/007* (2013.01)

(58) Field of Classification Search
CPC ........ E03C 1/304; E03C 1/284; E03C 1/1222; G05D 7/635; E03F 9/00; E03F 9/002; E03F 9/005; E03F 9/007; E03F 5/14; B08B 9/02
USPC .......... 137/312, 313, 314, 562, 565.36, 247, 137/24.11, 247.41, 247.51, 240, 602, 892; 4/679, 681, 256.1
See application file for complete search history.

(56) References Cited

U.S. PATENT DOCUMENTS

| 798,713 | A | * | 9/1905 | Strickland | ............... E03C 1/306 137/240 |
| 2,059,733 | A | * | 11/1936 | Heisser | ................... E03C 1/306 137/239 |
| 2,187,043 | A | * | 1/1940 | MacMillan | ............. E03C 1/306 134/168 C |
| 3,526,547 | A | * | 9/1970 | Shock | ..................... E03C 1/284 134/166 C |
| 3,880,176 | A | * | 4/1975 | Horne | ....................... C02F 1/50 118/306 |
| 4,031,914 | A | | 6/1977 | Neri | |
| 4,179,762 | A | | 12/1979 | Barnhardt et al. | |
| 4,301,554 | A | | 11/1981 | Wojcicki | |
| 4,949,406 | A | | 8/1990 | Carnelli | |
| 5,038,816 | A | | 8/1991 | Weltsch | |
| 5,988,188 | A | * | 11/1999 | Born | ..................... B08B 9/0433 134/22.11 |
| 6,053,187 | A | * | 4/2000 | Altomonte | ............ B08B 9/0321 134/169 C |
| 6,308,350 | B1 | | 10/2001 | Marchionda | |
| 7,799,216 | B2 | | 9/2010 | Gurmu | |
| 8,266,740 | B2 | * | 9/2012 | Baird | ........................ E03C 1/28 4/679 |
| 8,382,993 | B1 | | 2/2013 | Wisek et al. | |
| 8,887,753 | B2 | | 11/2014 | Sutherland | |
| 2006/0152995 | A1 | * | 7/2006 | Kreutzer | ................... B28C 7/02 366/8 |

(Continued)

*Primary Examiner* — Matthew W Jellett
*Assistant Examiner* — Christopher Ballman
(74) *Attorney, Agent, or Firm* — Angela M. Brunetti

(57) ABSTRACT

A system and method for flushing a drain trap body having first and second channels with a dividing wall between that provides for one or more separate and dedicated streams of water operable to flush debris from the two-channel drain trap body.

20 Claims, 4 Drawing Sheets

(56) References Cited

U.S. PATENT DOCUMENTS

2014/0304901 A1   10/2014  Salzer
2014/0352047 A1   12/2014  Goldsmith
2015/0247583 A1*   9/2015  Garnett .................. F16K 15/03
                                                    137/15.04

* cited by examiner

SYSTEM AND METHOD FOR FLUSHING A DRAIN TRAP

TECHNICAL FIELD

The inventive subject matter relates generally to a drain system and, more particularly, the inventive subject matter is directed to devices, systems and methods for flushing a drain trap that is part of a drain system.

BACKGROUND

A typical drain system commonly used in building structures such as, for example, residential housing, apartment complexes, commercial/industrial buildings and the like is a gravity system. A gravity system relies on gravity to move waste water from a plumbing device, such as a sink, through drain pipes and into a sewer system. In typical systems, a trap, commonly referred to as a P-trap, is located directly under each plumbing device. The P-trap includes a wastewater channel having a U-shaped portion. A small amount of the wastewater from the plumbing device, remains in the U-shaped portion following the flow of wastewater though the P-trap. The U-shaped portion is sized and shaped such that it is filled by the remaining portion of the wastewater fill after the introduction of wastewater into the P-trap is discontinued. The remaining portion for the wastewater fills the entire cross section of the wastewater channel thereby forming a gas-proof barrier that prevents gases from the sewer system from escaping through the drain system into the environment surrounding the plumbing device.

In operation, it is common for the wastewater to include debris deposited into the plumbing device. For example, debris is often introduced into a stream of clean water that flows into the plumbing device. During flow of wastewater through the P-trap, it is also common for at least a portion of the debris to sink/settle to the bottom of the U-shaped portion of the P-trap. As a result, it is also common for the P-trap to collect debris that sinks/settles to the bottom off the P-trap as it falls out of suspension within the wastewater, thereby creating a clog in the U-shaped portion of the P-trap. It is well-known that the clogged drain can cause wastewater to back up into the plumbing device. In order to remove the clog, it is often necessary to remove the P-trap from the drain system for allowing the debris causing the clog to be removed or to allow the P-trap to be replaced, both of which often require the services of a plumber.

Therefore, a solution to the problem of debris clogging the P-trap of a drain system without the need to remove the P-trap or otherwise involve the services of a plumber would be advantageous, desirable, and useful.

SUMMARY

Embodiments of the present invention are directed to a P-trap (also referred to herein as a "drain trap") configured to address the problem of becoming clogged from debris that settles in the U-shaped portion of the P-trap. More specifically, a P-trap configured in accordance with one or more embodiments of the present invention has a construction that presides for one or more separate and dedicated stream of water that is are selectively operable to flush debris from the U-shaped portion of the P-trap. Accordingly, embodiments of the present invention advantageously solve the problem of clearing debris that is clogging the P-trap of a drain system in a manner that does not require removal of the P-trap or otherwise involve the services of a plumber.

In one embodiment of the present invention, a drain trap apparatus comprises a drain trap body. The drain trap body has a first channel and a second channel adjacent to the first channel. The first channel has opposing end portions that define an inlet and an outlet of the drain trap body. A dividing wall extends between the first and second channels. At least one port is provided within the dividing wall, extending between the first and second channels thereby defining at least one outlet of the second channel that is exposed within the first channel. An inlet in the first channel is adapted to receive liquid from a pressurized external liquid supply.

In another embodiment of the present invention, a method is provided for flushing a wastewater channel of a drain trap apparatus that has having a flushing water channel coupled to the waste water channel through at least one port extending through a dividing wall between the wastewater channel and the flushing water channel. The method comprises the steps of providing a pressurized supply of water at an inlet of the flushing water channel and allowing a portion of the water to pass from within the flushing water channel into the wastewater channel through the at least one port.

In yet another embodiment of the present invention, a drain trap system comprises a drain trap body, a drain trap flushing unit and a controller. The drain trap flushing unit is coupled to the drain trap body. The drain trap body has a wastewater channel with a U-shaped portion. A flushing water delivery portion of the drain trap flushing unit is attached to the U-shaped portion of the wastewater channel. The drain trap flushing unit is adapted to deliver one or more streams of water into the wastewater channel through a wall separating a flushing water channel of the drain trap flushing unit from the wastewater channel of the drain trap body. The controller is coupled to the drain trap flushing unit and is adapted to cause the one or more streams of water to be delivered into the wastewater channel in response to receiving a flushing operation initiation command.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
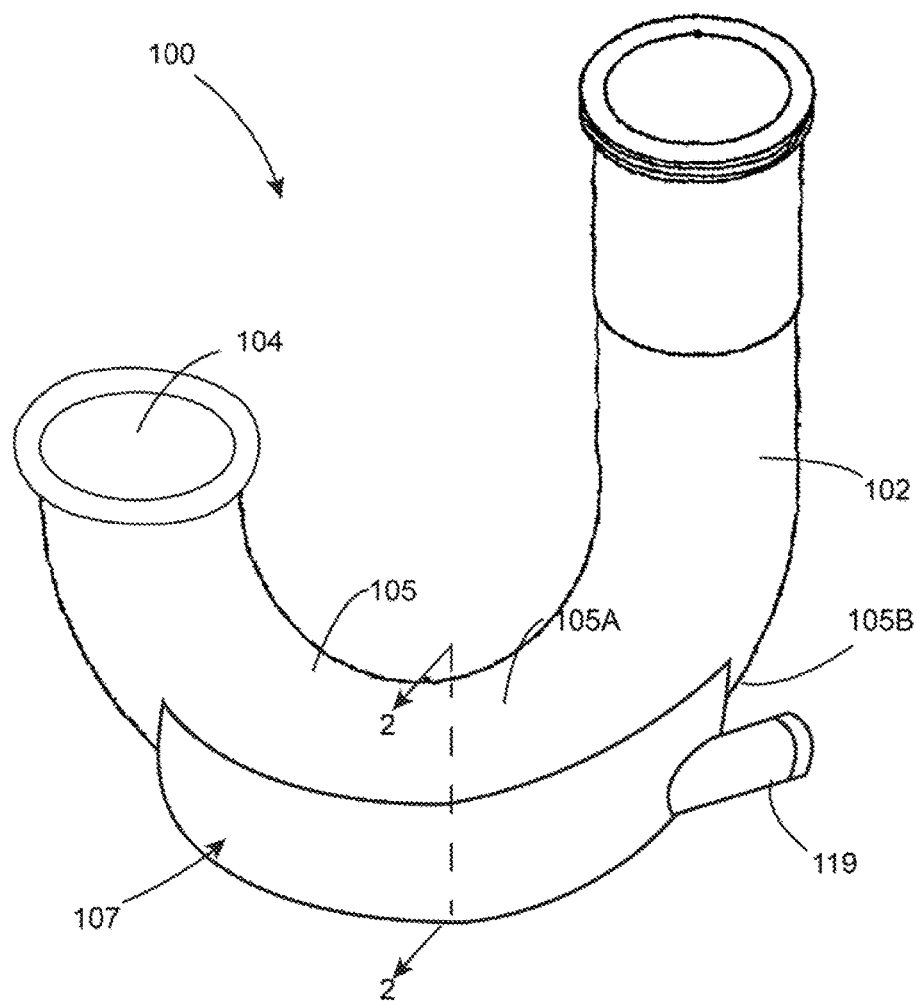
FIG. 1 is a side view of a drain trap apparatus of one or more embodiments of the inventive subject matter.
Figure 2:
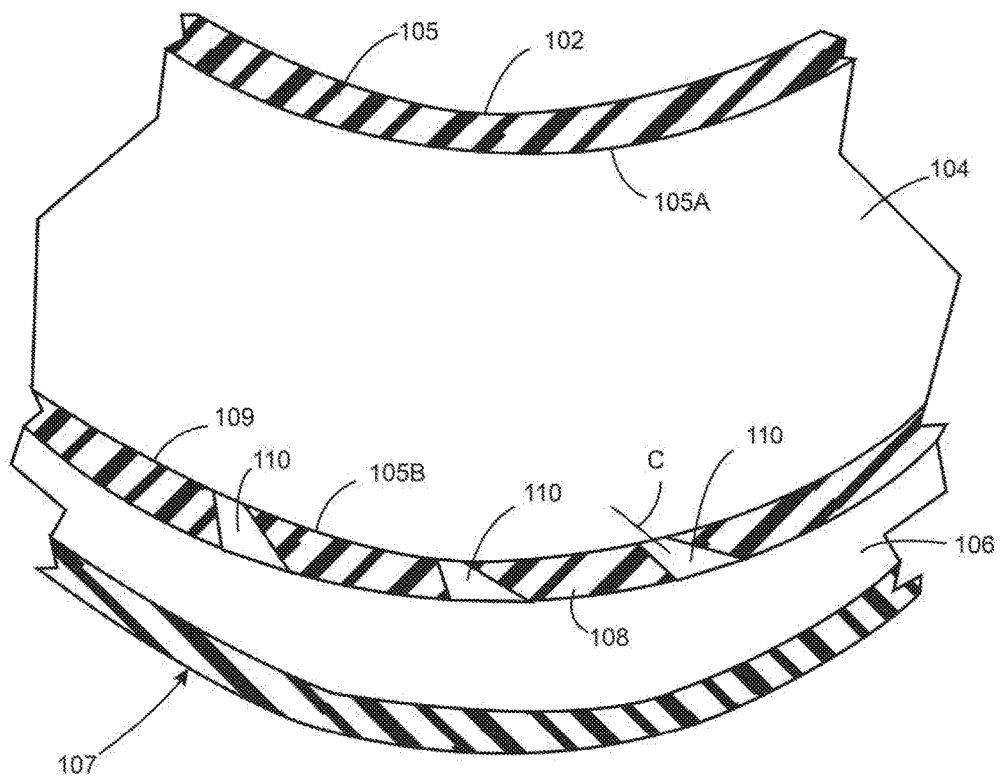
FIG. 2 is a fragmentary cross-section of the drain trap apparatus of the present invention taken along line 2-2 in FIG. 1.

FIGS. 1 and 2 show a drain trap apparatus 100 of the inventive subject matter (i.e., a drain trap apparatus configured in accordance with an embodiment of the present invention). The drain trap apparatus 100 includes a drain trap body 102 and a drain trap flushing unit 107 that is integral with the drain trap body 102. The drain trap body 102 is also commonly referred to as a P-trap. The drain trap body 102 has a wastewater channel 104 (i.e., upper channel) that may have a U-shaped portion 105 having an inner diameter 105A and an outer diameter 105B.

The drain trap body 102 is associated with a plumbing device, such as a sink or a tub. An inlet of the drain trap body 102 is connected to the plumbing device and an exit of the drain trap body 102 is connected to a sewer system, septic system or other system in which the wastewater is disposed and or processed, thereby allowing wastewater (i.e., liquid) from the plumbing device to be delivered to the sewer system, septic system or other system. A height of the plumbing device above the drain trap body 102 provides a column of wastewater during use of the plumbing device that pushes a portion of the wastewater though the drain trap body 102 and into a sewer system, septic system or other system in which the wastewater is disposed and/or processed. In embodiments where the drain trap body 102 has a U-shaped portion 105 orientated with the outer diameter 105B in a downward position, wastewater gathers in the U-shaped portion 105 to form a gas-proof barrier that prevents gases from the sewer (or other downstream) system from escaping through the drain trap body 102 and plumbing device into the environment surrounding the plumbing device.

In operation, certain materials in wastewater (e.g., solids) tend to settle or otherwise gather in the U-shaped portion 105 of the drain trap body 102. Excessive collection of such materials is well known to clog the wastewater channel 104, thereby preventing suitable flow of wastewater through the drain trap body 102 which may cause a slowing of draining and/or backup of wastewater info the plumbing device. Advantageously, to clear all or a portion of such material from within the drain trap body 102 for restoring suitable flow of wastewater through the wastewater channel 104, the drain trap flushing unit 107 is adapted to deliver one or more streams of water (i.e., flushing water) into the wastewater channel 104 and more specifically, preferably into the U-shaped portion of the drain trap body 102. For example, the flushing water may be delivered into the wastewater channel 104 from a flushing channel 106 (i.e., a lower channel) of the drain trap flushing unit 107 through a wall that separates the flushing water channel 106 from the wastewater channel 104 (i.e., a dividing wall 108). The dividing wall 108 may include one or more ports 110 adjacent one another along the dividing wall 108, with each port extending between the flushing water channel 106 and the wastewater channel 104. In this respect, a flushing water delivery portion of the drain trap flushing unit 107 may comprise the flushing water channel 106 and the flushing water channel 106 may be connected to the U-shaped portion 105 of the drain trap body at the outer diameter 105B thereof.

In some embodiments, the drain trap body 102 (and components thereof) may be a unitary article (e.g., a one-piece component or assembled multi-piece component) that comprises the wastewater channel 104, the flushing water channel 106, the dividing wall 108 and the one or more ports 110. The drain trap body 102 may be manufactured using many processes known in the art, for example injection molding.

The flushing water may be provided to the drain trap flushing unit 107 from a source of pressurized water. An example of such a source of pressurized water is the water supply that serves a plumbing device to which the drain trap apparatus is connected (e.g., the water line connected to a sink faucet). The drain trap flushing unit 107 preferably includes a valve, not shown in FIG. 1, located upstream of a supply water inlet 119 for allowing the flushing water to be selectively supplied into the flushing water channel 106. A control portion of the valve may be provided for allowing the valve to be manually transitioned from the closed orientation to the open orientation. A valve actuator may be provided for allowing the valve to be electronically controlled. To this end, as discussed below in greater detail, the drain trap flushing unit 107 may include a drain trap flushing controller that is integral with or separate from the valve actuator 220 (see FIG. 3), which serves as an electronic interface (e.g., via digital communication over a communication line 124) between the drain flushing apparatus 100 and a remote control device that is adapted for allowing the valve to be transitioned from a closed configuration to an open configuration. Although in exemplary embodiments disclosed herein flushing water is disclosed, it is disclosed herein that the flushing operation of the drain trap flushing unit 107 can be performed using a liquid other than water or in addition to water. It is also disclosed herein that one or more streams of a gas such as, for example, air could be delivered into the wastewater channel 104 from the drain trap flushing unit 107 (e.g., in place of or in addition to water that is delivered via the flushing water channel 106) such as separately or in combination with a liquid used for flushing the wastewater channel.

The ports 110 may each be of the same configuration (e.g., size and shape) or a first portion of the ports 110 may be of a different configuration of a second portion of the ports 110. Preferably, each one of the ports 110 is configured (e.g., sized and or shaped) to limit or prevent debris from waste water from passing through the ports 110 and entering into the flushing water channel 106, yet still allowing for the stream of water to be delivered into the wastewater channel 104 through each one of the ports 110 with sufficient force and volume. One or more of the ports can have a baffle or backflow-preventer for limiting the flow of wastewater and/or debris into the flushing channel 104.

Referring to FIG. 2, a preferred embodiment of the configuration of the ports 110 with respect to the wastewater channel 104 is shown. The one or more ports 110 are preferably placed and configured for causing debris that has settled in the U-shaped portion 105 of the wastewater channel 104 to be dislodged (e.g., broken up) and directed toward the exit of the wastewater channel 104. To this end, in preferred embodiments, one or more of the ports 110 may have a center line axis C that is substantially skewed at an angle with respect to a surface 100 of the dividing wall 108 that defines an interior surface of the wastewater channel 104 at a location of the dividing wall 108 at which a respective one of the ports 110 is exposed within the wastewater channel 104 (i.e., an angled inner circumference of the port 110). Upon opening the valve 118 to create a flow of flushing water from the external water supply, a size of the one or more ports and the angled orientation of the one or more ports facilitates the flow of waste water (now including any flushing water) and debris by forcing the debris and waste water in the direction as defined by the angle of the one or more ports 110. In embodiments where there is a plurality of ports 110, each one of the ports 110 may have a different angle than or substantially the same angle as one or more other ones of the ports 110 (e.g., the ports 110 adjacent thereto). An angled port configuration facilitates a directional flow of debris and water in the wastewater channel 104 during a flushing operation. The benefit of one or more of the ports 110 having such an angled discharge direction is that debris that is dislodged by the one or more streams of flushing water is urged toward an exit of the wastewater channel 104, thereby aiding in such debris being expelled from within the wastewater channel 104.

Figure 3:
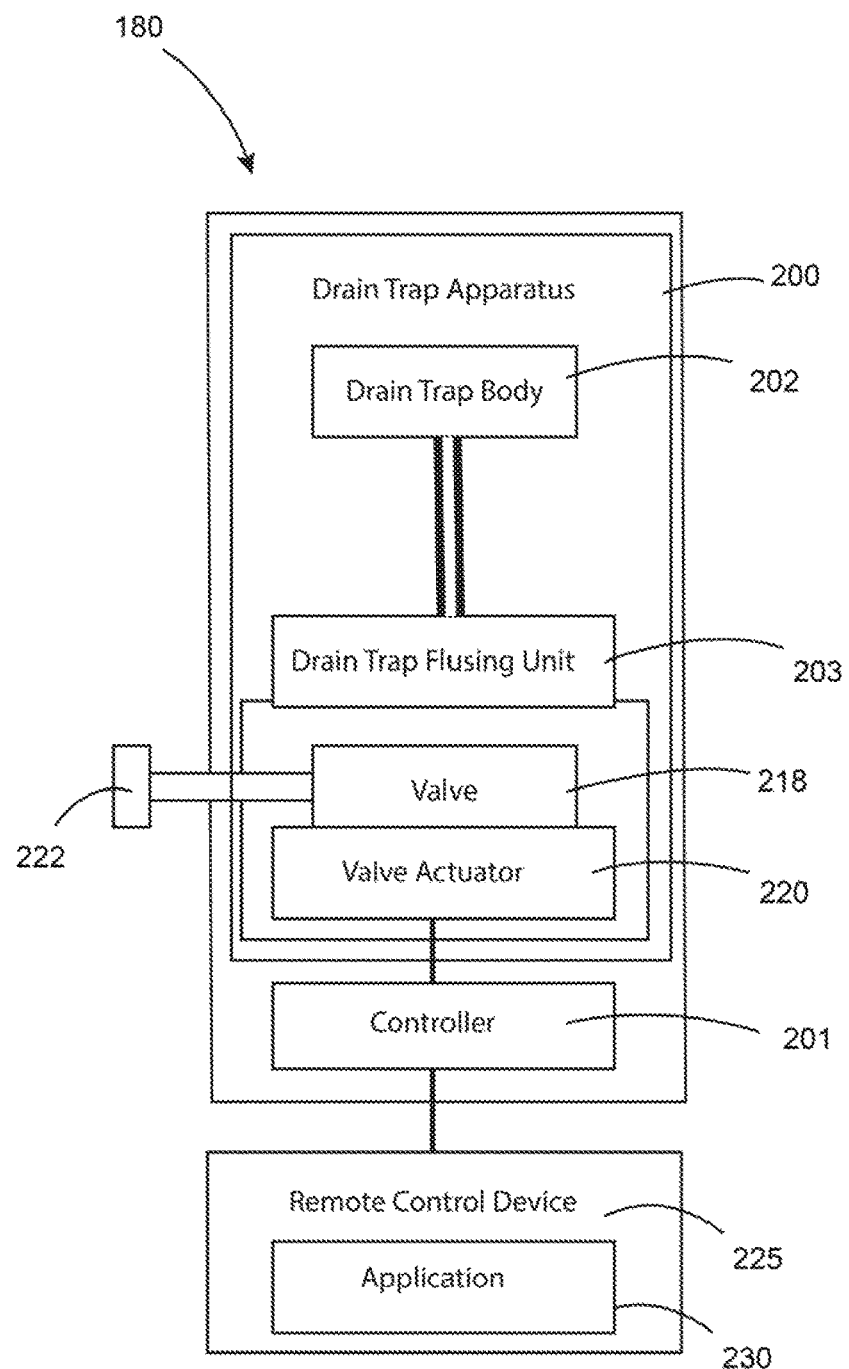
FIG. 3 is a block diagram of a system of one or more embodiments of the present invention.

FIG. 3 shows a drain trap system 180 configured in accordance with an embodiment of the present invention. The drain trap system 180 comprises a drain trap apparatus 200 and a drain trap flushing controller 201. The drain trap apparatus 200 may comprise a drain trap body 201 and a drain trap flushing unit 203. Preferably, the drain trap flushing unit 203 is integral with the drain trap body 202. In some embodiments the drain trap body 202 and the drain trap flushing unit 203 of the system 200 can be the same or substantially the same as the drain trap body and the drain trap flushing unit discussed above in reference to FIGS. 1 and 2, such that element names referred to in reference to the drain trap body 202 and the drain trap flushing unit 203 correspond to the same element names of the drain trap body 102 and the drain trap flushing unit 107 discussed above in FIGS. 1 and 2.

The drain trap flushing controller 201 is connected to a valve actuator 220 of a valve 218 of the drain trap flushing unit 203. The valve actuator 220 may be a unitary component of the valve 218 or a discrete component that is coupled to me valve 218. In response to the drain trap flushing controller 201 receiving a flushing operation initiation command (e.g., control signal), the drain trap flushing controller 201 causes the valve actuator 220 to transition the valve 218 from a closed configuration to an open configuration and, in doing so, allowing one or more streams of flushing water to be delivered into the wastewater channel of the drain trap body 202 through a wall separating a flushing water channel of the drain trap flushing unit 203 from the wastewater channel of the drain trap body 202. In one embodiment, the flushing operation initiation command that is received by the drain trap flushing controller 201 may be issued by a sensor or other system component that outputs the flushing operation initiation command in response to one or more conditions being met. Examples of such conditions include, but are not limited to, a certain chronological time being attained (e.g., a given time on a given date), a prescribed duration of time elapsing (e.g., a given number of hours, weeks or months since a last instance of a flushing operation), a flow rate of wastewater decreasing below a specified level, a remote information communication device transmitting a flushing operation request for reception by the system. To this end, the system may include a flow detection device for detecting when a flow rate of wastewater decreasing below the specified level and/or may include a signal receiver adapted for receiving a flushing operation request from a remote system. The flow detection device and/or the signal receiver may be an integral part of the drain trap flushing controller 201, may be a standalone component with respect to the drain trap flushing controller 201, or may be a combination thereof. With respect to a remote information communication device transmitting a flushing operation request for reception by the system, a wireless communication device such as a smartphone may be configured for issuing the flushing operation request such as, for example, via an application adapted for causing issuance of such flushing operation request (e.g., at the command of a user of the application). The drain trap flushing controller 201 may be suitably configured digital circuitry executing instructions for causing flushing water to be selectively delivered into the wastewater channel.

Transitioning of the valve between a closed configuration and an open configuration may be implemented manually, remotely, electronically, and/or automatically. Manual operation requires a user to manually manipulate a manual control portion 222 of the valve 218 and/or manual control portion 222 of the valve actuator 220 to introduce a flow of liquid (e.g., flushing water) into the drain tap flushing unit 203. Remote operation may be accomplished by the valve actuator 220 being in wireless or wired communication (e.g., via the drain trap flushing controller 201) with a remote control device 225 that functions to operate the valve 218 and control the flow of liquid from the external supply. For example, the valve actuator 220 and/or the drain trap flushing controller 201 may include a wireless communication device such, as a Blue Tooth receiver, radio frequency, WiFi or other similar connection, to receive a transmission from the remote control device 225. The remote control device 225 may be a radio transmitter, a mobile phone, or other remote device, capable of transmitting a wireless control signal to a receiver of the trap flushing controller 201 or the valve actuator 220 in order to remotely control the valve 218. The remote control device 225 may operate to transmit a signal to open and close the valve 218 as desired to control the flow of liquid from the external water supply into the flushing water channel 206 of the drain trap flushing unit 203, thereby forcing the flow of liquid (e.g., flushing water) through the one or more ports between the flushing water channel 206 and the wastewater channel 204. The remote control device 225 is adapted for allowing the valve to be selectively transitioned from the closed configuration to the open configuration. To this end, the remote control device 225 may run an application 230 adapted to issue a flushing request that may be transmitted in a wired or wireless manner from the remote control device for reception by the drain trap flushing controller 201.

Figure 4:
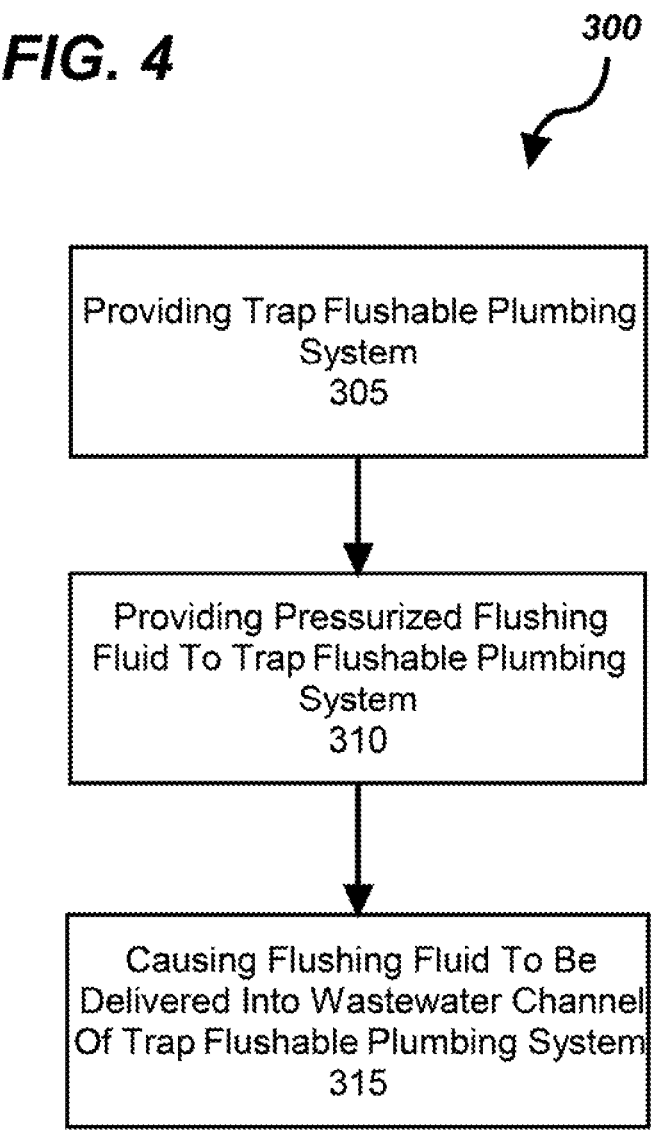
FIG. 4 is a block diagram of a method of one or more embodiments of the present invention.

FIG. 4 is a block diagram of a method 300 of one or more embodiments of the present invention. The method 300 begins with a step 305 for providing a plumbing system including a drain trap body (e.g., the drain trap body 102 discuss above in reference to FIGS. 1 and 2) and a drain trap flushing unit (e.g., the drain trap flushing unit 107 discuss above in reference to FIGS. 1 and 2) coupled to the drain trap body. As discussed above in reference to FIGS. 1 and 2, a drain trap apparatus may comprise the drain trap body and the drain trap flushing unit, with the drain trap apparatus having a wastewater channel and a flushing water channel that is coupled to the waste water channel through at least one port extending through a dividing wall between the wastewater channel and the flushing water channel.

In conjunction with or after providing the plumbing system, a step 310 is performed for providing a pressurized supply of drain trap flushing water at an inlet of the flushing water channel. For example, the pressurized supply of drain trap flushing water may be that the serves the plumbing device to which the drain trap body is connected and may be connected to the drain trap flushing unit at a valve thereof. Optionally or alternately, a liquid other than water and or a gaseous substance can be provided to the drain trap flushing unit for performing flushing of the wastewater channel (i.e., the flushing water channel is a flushing substance channel).

After providing the pressurized supply of water at an inlet of the flushing water channel, a step 315 is performed for causing the flushing water (and/or other flushing substance) to be delivered from the drain trap flushing unit into the wastewater channel through one or more ports within a wall that defines the wastewater channel. Preferably, one or more of the ports is located within a U-shaped portion of the wastewater channel and may be angled with respect to a surface of the wall at which the respective one of the ports is exposed within the wastewater channel. One mode of causing the flushing water (and/or other flushing substance) to be delivered from the drain trap flushing unit into the wastewater channel may be in response to detecting a flow condition in the wastewater channel and a corresponding control signal (e.g., a valve actuation command) being issue and transmitted such as, for example, in a wired or wireless manner by a flow detection sensor thereby cause a valve actuator to open the valve. Another mode of causing the flushing water (and/or other flushing substance) to be delivered from the drain trap flushing unit into the wastewater channel may include at the command of a control signal send via a data processing system such as, for example, a smartphone, tablet, laptop computer or the like (e.g., in response to a flushing request issued via an application running on the data processing device system and transmitted in a wired or wireless manner). Still another mode of causing the flushing water (and/or other flushing substance) to be delivered from the drain trap flushing unit into the wastewater channel may include the valve (or other flow control element) of the drain trap flushing unit being manually manipulated.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing front the general principles of the same.

The invention claimed is:

1. A drain trap apparatus, comprising;
   a drain trap body having a first channel, with opposing end portions that define an inlet and an outlet thereof and having a second channel adjacent to the first channel;
   a stationary dividing wall extending parallel to and separating the first and second channels;
   at least one port within the dividing wall extending between the first and second channels thereby defining at least one outlet of the second channel that is exposed within the first channel; and
   an inlet in the second channel adapted to receive liquid from a pressurized external supply.

2. The drain trap apparatus of claim 1 wherein
   a plurality of ports are provided within the dividing wall each extending between the first and second channels; and
   at least a portion of the ports have a centerline axis that is substantially skewed at an angle with respect to a surface of the dividing wall that defines an interior surface of the first channel at a location of the wall at which a respective one of the ports is exposed within the first channel.

3. The drain trap apparatus of claim 2 wherein the angle of a first one of the ports is substantially different than an angle of a second one of the ports.

4. The drain trap apparatus of claim 1 wherein:
   the first channel is substantially U-shaped whereby the first channel has an inner diameter and an outer diameter;
   the dividing wall is at the outer diameter of the first channel; and
   the second channel extends along the first channel adjacent to the outer diameter thereof.

5. The drain trap apparatus of claim 4 wherein:
   a plurality of ports is provided within the dividing wall each extending between the first and second channels; and
   at least a portion of the ports have a centerline axis that is substantially skewed at an angle with respect to a surface of the dividing wall that defines an interior surface of the first channel.

6. The drain trap apparatus of claim 5 wherein each port is spaced a predetermined distance from an adjacent port along the dividing surface.

7. The drain trap apparatus of claim 1, further comprising:
   a valve coupled to the inlet of the second channel;
   wherein the valve is at least one of remotely operable and automatically operable.

8. A method for flushing a wastewater channel of a drain trap apparatus having a flushing water channel coupled to the waste water channel through at least one port extending through a dividing wall between the wastewater channel and the flushing water channel, the method comprising the steps of:
   providing a pressurized supply of water at an inlet of the flushing water channel, the dividing wall extending parallel to and separating the flushing water channel from the wastewater channel; and
   allowing a portion of the water to pass from within the flushing water channel into the wastewater channel through the at least one port.

9. The method of claim 8 wherein allowing the portion of the water to pass from within the flushing water channel into the wastewater channel through the port includes directing a stream of the water in a direction toward an exit of the wastewater channel.

10. The method of claim 9 wherein;
a plurality of the ports each have a centerline axis that is substantially skewed at an angle with respect to a surface of the dividing wall that defines an interior surface of the wastewater channel; and
directing the stream of the water in the direction toward the exit of the wastewater channel includes allowing a portion of the water to flow through the plurality of ports.

11. The method of claim 8 wherein allowing the portion of the water to pass from within the flushing water channel into the wastewater channel through the at least one port includes controlling a valve at the inlet of the flushing water channel.

12. The method of claim 11, further comprising:
detecting a condition requiring flushing of the wastewater channel, wherein controlling the valve includes issuing a control signal for causing the valve to transition from a closed configuration to an open configuration in response to detecting the condition.

13. The method of claim 12, further comprising:
a valve controller connected to the valve causing the valve controller to transition the valve from the closed configuration to the open configuration in response to receiving a valve actuation command.

14. The method of claim 13 wherein the valve controller wirelessly receives the valve actuation command.

15. The method of claim 13, further comprising:
a flow detector connected to the valve controller determining that a wastewater channel flushing operation needs to be performed;
the valve controller transitioning the valve from the closed configuration to the open configuration in response to the flow detector determining that the flushing operation needs to be performed.

16. A drain trap system, comprising:
a drain trap body having a U-shaped portion divided into an upper wastewater channel and a lower flushing water channel by a wall extending parallel to and separating the wastewater and flushing channels;
a drain trap flushing unit is coupled to the drain trap body, a flushing water delivery portion of the drain trap flushing unit is attached to the lower flushing water channel of the drain trap body, the drain trap flushing unit is adapted to deliver one or more streams of water into the wastewater channel through the wall separating the flushing water channel of the drain trap body from the wastewater channel of the drain trap body; and
a controller coupled to the drain trap flushing unit and adapted to cause the one or more streams of water to be delivered into the wastewater channel in response to receiving a flushing operation initiation command.

17. The drain trap system of claim 16 wherein:
the wall separating the flushing water channel of the drain trap body from the wastewater channel of the drain trap body includes a plurality of ports therein that each extend between the wastewater channel and the flushing water channel; and
at least a portion of the ports have a centerline axis that is substantially skewed at an angle with respect to a surface of the wall separating the flushing water channel from the wastewater channel at a location of the wall at which a respective one of the ports is exposed within the wastewater channel.

18. The drain trap system of claim 16 wherein the controller is integral with the drain trap flushing unit.

19. The drain trap system of claim 18 wherein:
the drain trap flushing unit including a valve connected to the flushing water channel for allowing water under pressure from an external water supply source to be selectively provided into the flushing water channel for delivery to the wastewater channel; and
the controller is adapted to detect a condition requiring flushing of the wastewater channel and, in response to detecting the condition requiring flushing of the wastewater channel, causing the valve to transition from a closed configuration to an open configuration.

20. The drain trap system of claim 16, further comprising:
a wireless communication apparatus adapted to transmit information for reception by a controller of the drain trap flushing unit, wherein the controller is adapted to cause the one or more streams of water to be delivered into the wastewater channel in response to receiving a flushing operation request transmitted from the wireless communication device for reception by the controller of the drain trap flushing unit and wherein the controller is adapted for enabling water from an external water supply source to be selectively provided into the flushing water channel.

* * * * *